United States Patent [19]
Evans et al.

[11] Patent Number: 5,599,603
[45] Date of Patent: Feb. 4, 1997

[54] MANUFACTURE OF CARBON FIBRE PREFORM

[75] Inventors: Maurice J. Evans, Lichfield; Keith A. Williams, Birmingham; Ronald Fisher, Warwickshire, all of Great Britain

[73] Assignee: Dunlop Limited, A British Company, London, England

[21] Appl. No.: 202,890

[22] Filed: Feb. 28, 1994

Related U.S. Application Data

[63] Continuation of Ser. No. 809,514, filed as PCT/GB90/01134 Jul. 24, 1990 published as WO91/01397 Feb. 7, 1991, abandoned.

[30] Foreign Application Priority Data

Jul. 25, 1989 [GB] United Kingdom .................. 8917003
Dec. 12, 1989 [GB] United Kingdom .................. 8928031

[51] Int. Cl.⁶ ........................................... B32B 3/02
[52] U.S. Cl. ................... 428/66.2; 28/110; 28/111; 28/114; 28/115; 28/116; 28/117; 188/250 C; 188/251 R; 188/251 A; 428/64.1; 428/66.6; 428/408; 442/402
[58] Field of Search .............. 428/65, 234, 408, 428/233, 64.1, 66.2, 66.6; 28/110, 111, 114, 115, 116, 117; 188/218 XL, 250 R, 251 R, 251 A, 250 C

[56] References Cited

U.S. PATENT DOCUMENTS

| | | | |
|---|---|---|---|
| 3,991,248 | 11/1976 | Bauer | 428/408 |
| 4,396,663 | 8/1983 | Mitchell et al. | 428/111 |
| 4,457,055 | 7/1984 | Ambrose et al. | 28/111 |
| 5,145,732 | 9/1992 | Kyutoku | 428/408 |

FOREIGN PATENT DOCUMENTS

| | | |
|---|---|---|
| 0079808 | 5/1983 | European Pat. Off. . |
| 0232059 | 8/1987 | European Pat. Off. . |
| 3220306 | 12/1982 | Germany . |
| 3307090 | 9/1984 | Germany . |
| 61-35941 | 8/1986 | Japan . |
| 62-25094 | 6/1987 | Japan . |
| 1370755 | 10/1974 | United Kingdom . |
| 1447030 | 8/1976 | United Kingdom . |
| 2012671 | 8/1979 | United Kingdom . |
| 2148187 | 5/1985 | United Kingdom . |

*Primary Examiner*—Nasser Ahmad
*Attorney, Agent, or Firm*—Watson Cole Stevens Davis, P.L.L.C.

[57] ABSTRACT

In a method of making a carbon fibre preform such as for use in the manufacture of a friction disc a compressible body of carbon fibre or carbon fibre precursor material is acted upon by compressing means to compress the body to a required thickness and then operated upon by means such as a barbed needle-punch needle for a stitching thread which penetrates substantially the whole thickness of the body whereby the compressed preform may be removed from action by the compressing means in a free-standing and compressed state. If the method uses carbon fibre precursor material, that is then subjected to carbonization.

37 Claims, 1 Drawing Sheet

MANUFACTURE OF CARBON FIBRE PREFORM

This application is a continuation of application Ser. No. 07/809,514, filed as PCT/GB90/01134 Jul. 24, 1990 published as WO91/01397 Feb. 7, 1991, now abandoned.

BACKGROUND OF THE INVENTION

This invention relates to the manufacture of carbon fibre preforms such as are used for the manufacture of carbon-carbon composites and particularly for the manufacture of articles such as carbon brake discs made from such materials.

It is customary in the manufacture of carbon brake discs by the Chemical Vapor Deposition (CVD) method to compress a stack of layers of carbon fibre fabric in a suitable jig before loading the stack, in the jig, into the CVD furnace. The jig requires time to assemble and takes up valuable space in the furnace, and one object of the present invention is to provide an improved method for making a free-standing carbon fibre preform which does not require a jig.

SUMMARY OF THE INVENTION

According to one aspect of the present invention, a method of making a carbon fibre preform comprises forming a compressible body of carbon fibre or carbon fibre precursor material, providing means for compressing the body to a required thickness, compressing the body and operating on the compressed body by needle means which penetrates substantially the whole thickness of the compressed body whereby the compressed preform may be removed from action by the compressing means in a free-standing and compressed state.

If the method utilises carbon fibre precursor material for forming the body, the compressed body is to be subject to carbonisation to produce the carbon fibre preform.

Preferably use is made of a body comprising a stack of at least 10 and more preferably at least 20 layers of carbon fibre or carbon fibre precursor material. The fibres in each layer may be woven into the form of a fabric or may be in the form of a butt or non-woven fabric. The fibres of the body alternatively may be arranged in a non-layered manner, for example they may be arranged as a three-dimensional array of either randomly or preferentially orientated fibres.

The carbon fibre or carbon fibre precursor material may be of non-woven oxidized polyacrylonitrile (PAN), for example of staple fibres and/or continuous filaments, and the thickness of the compressible body may be chosen according to the desired thickness of the article to be produced.

The needle means may comprise barbed needles which are caused to penetrate substantially the whole thickness of the compressed body in each of a plurality of needle-punching operations so as to enable the compressed preform subsequently to be removed from the press in a free-standing and compressed state.

In the case of an aircraft carbon brake disc the thickness required may be of the order of at least 50 mm, and while needling of individual layers of material, or of partly-assembled stacks of layers of material has previously been disclosed (see for example U.K. Patent No. 2012671) the present invention seeks to produce a full-thickness preform in which elements such as fibres or fibre bundles penetrate the whole thickness of the preform to lock together the layers or fibres of a three-dimensional, non layered array sufficiently firmly to provide a free-standing, i.e. self supporting structure which does not require a jig to maintain its size and shape during subsequent handling, carbonization, and CVD densification.

The needling process may be carried out without any transverse movement of the body relative to the needles between punching operations, thus ensuring that the needles penetrate the same areas of the fabric in each punching operation. The effect of this is to produce thick fibre bundles which extend through substantially the whole thickness of the compressed preform.

The needling process may comprise two series of punching operations and the body may be moved relative to the needles between said two series of punching operations thereby to produce two arrays of thick fibre bundles which each extend through substantially the whole thickness of the preform. The body may be inverted between the two punching operations so that needling occurs from opposite sides thereof. Transverse relative movement may be achieved by releasing the body from compression by the press so that the body may be moved relative to the press. Alternatively use may be made of a press member having two series of needle apertures whereby relative transverse movement between the body and needles may be achieved by performing one series of punching operations with the needles extending through one series of needle apertures and then moving the needles relative to the press member to perform a second series of punching operations during which the needles extend through a second series of needle apertures.

It is also taught by the present invention that the method may comprise needling the body by means of two arrays of needles arranged to enter the body one at one face of the body and the other at an opposite face of the body. The two arrays of needles may be arranged to perform needling operations simultaneously. Preferably the needles of the two arrays move in substantially the same direction.

As an alternative to needling with barbed needles said step of operating on the compressed body by needle means which penetrates substantially the whole thickness of the body may be comprised by an operation in which an element of a carbon, or carbon precursor (i.e. carbonizable) or other material is caused to penetrate substantially the whole thickness of the body.

Said step of operating on the compressed body by needle means which penetrates substantially the whole thickness of the body may be a so-called stitching type operation in which the element is caused to pass successively in alternating directions through the whole thickness of the compressed body typically with the assistance of a needle or other device such as an air propulsion device. The stitching pattern may be for example of a circular, line or zig-zag form and may be comprised of locking or running type stitches.

The element for example may be a continuous filament thread or a spun yarn, in either case the element being formed from a carbon or carbonizable fibre or from another type of fibre such as silica or silicon carbide. The element may be of a ceramic type material.

Preferably the element is of a kind which resists any significant deterioration when exposed to a temperature greater than 700° C. and more preferably greater than 1,000° C.

It is believed that a particularly suitable element, particularly for use in a stitching type operation, is a yarn formed from a carbon fibre tow that is stretch broken to form fine carbon slivers and then spun into a yarn. These spun yarns are more suitable for stitching than the original continuous filament tow because of a better flexibility and ability to be processed by textile machinery. Despite the tow having been stretch broken the resultant yarn exhibits a good tensile strength (typically in the order of 90 to 95% of that of the original tow).

Typically a plurality of elements will be employed, and more typically a plurality of elements will be caused simultaneously to penetrate substantially the whole thickness of the body.

The present invention also provides a full-thickness preform for an aircraft carbon brake disc in which one or more elements penetrate the whole thickness of the preform to lock together the layers or to lock together the fibres of a three-dimensional, non layered array sufficiently firmly to provide a free-standing, i.e. self supporting structure which does not require a jig to maintain its size and shape during subsequent handling, carbonization, and densification by for example a CVD or resin/char technique.

If the body comprises discrete layers of fibres, at least some of the layers may comprise a single sheet and at least some of the layers may comprise a plurality of portions of carbon precursor or carbon fibre material. A preform of for example a disc or annular shape may be assembled from layers at least one and optionally all of which is/are comprised by a plurality of portions, for example portions of sector shape.

BRIEF DESCRIPTION OF THE DRAWINGS

Methods in accordance with the invention will now be described, by way of example only, with reference to the accompanying drawings in which.

DETAILED DESCRIPTION OF THE INVENTION

Figure 1:
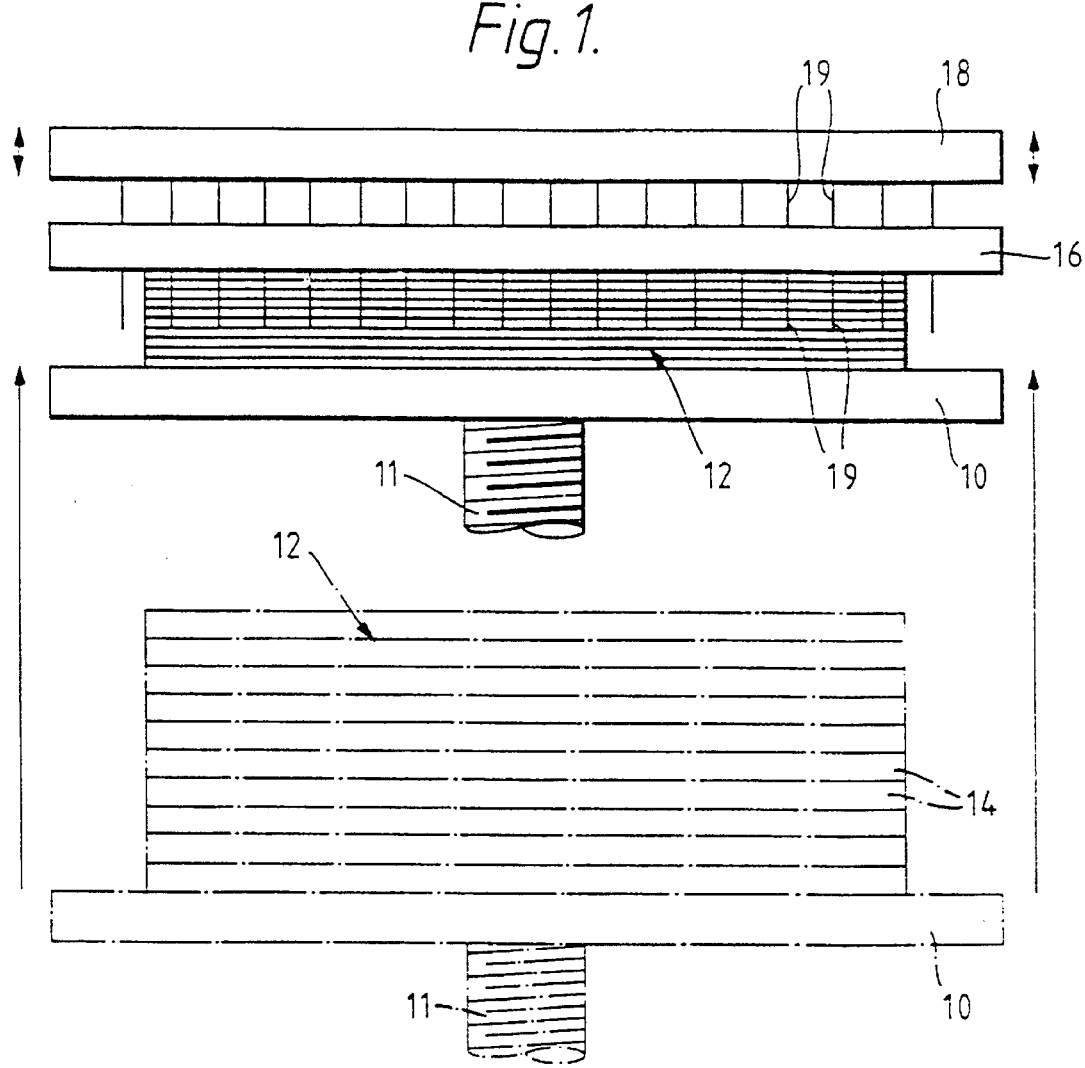
FIG. 1 is a diagrammatic elevation of a needle-punching press for use in accordance with one method of the present invention, and, FIG. 2 is a perspective view of a preform prior to being operated upon by another method in accordance with the present invention.

The press comprises a base plate 10 which is vertically movable by a lifting mechanism 11 between a lower position (indicated in dotted lines), where a stack 12 of sheets 14 of precursor fabric is assembled, to an upper position (as indicated in full lines), where the stack 12 is compressed against a perforated stripper plate 16. A needle plate 18 having a large number of vertically aligned barbed needles 19 is vertically movably mounted above the perforated stripper plate 16 with the needles 19 passing through the apertures (not shown) in the plate 16. Conventional power-operated means (not shown) is provided to effect vertical reciprocating movement of the needle plate 18, causing the needles 19 to punch through substantially the whole thickness of the stack 12. If the base plate 10 is of steel or similar material it is necessary to set the limit of vertical travel of the needles to stop just short of the surface of the base plate. Alternatively the base plate surface may be made from a yielding material to permit the needles to pass completely through the stack and into the yielding surface.

In a specific example, a non-woven fabric produced by needling oxidised PAN tows to a staple fibre oxidized PAN base was used for the manufacture of a preform for a carbon brake disc. Thirty four layers were cut in the form of annuli having an outside diameter of 431 mm and an inside diameter of 133 mm and laid up to form a compressible multilayer stack of approximately 180 to 203 mm in height. The stack was compressed between the base plate and the stripper plate to a thickness of 43 mm and given 150 punches with the barbed needles, which were evenly spaced at a density of approximately 7750 per square meter. The base plate was lowered and the stack turned over, recompressed and given 150 punches from the reverse side. This operation was repeated 4 more times with 100 punches from each side, giving a total of 700 punches to completely lock the structure. The free standing preform now had a thickness of approximately 43 mm and could be carbonized in that form. The percentage fibre by volume of the preform was approximately 30%.

In the above process, fibres are carried from the upper to the lower surface of the multilayer stack by the needle barbs in one operation. In each punching operation penetration of the needles occurs at the same place in the fabric, and this ensures that a large number of fibres are displaced across the layers in the areas where the needles penetrate. Movement of the pack is prevented by the pack being held between the base and the stripper plate.

By needling from opposite sides fibres from both surfaces are drawn through the preform to lock the structure together and the repeated punching operations in the same area cause thick fibre bundles to be present from the top to the bottom surface.

Figure 2:
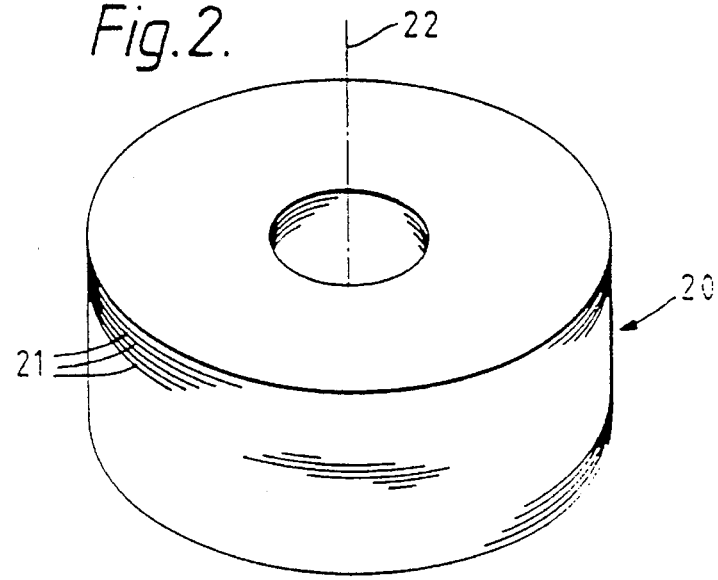

In accordance with a second embodiment of the present invention (see FIG. 2) a multilayer carbon preform for the manufacture of a carbon brake disc 20 comprises layers 21 of a non-woven fabric produced by needling oxidised PAN tows to a staple fibre oxidised PAN base. Thirty four layers 21 are cut in the form of annuli having an outside diameter of 431 mm and an inside diameter of 133 mm and laid up to form a compressible multilayer stack of approximately 180 to 203 mm in height. The stack is compressed between the guide plates of a stitching machine to a thickness of 43 mm. The compressed stack is then subject to a stitching operation in which the annular stack is rotated about its major axis 22 to result in a plurality of circumferentially extending lines of stitches in each of which stitched yarns extend completely through the stack of 34 layers. Thus on completion of the stitching operation the preform is capable of free-standing in a compressed condition.

The stitched yarns used in this example are of 800 denier and of the type commercially available under the name XAS Grafitex Heltra (ex Courtulads Fibres Ltd) and which are formed from a carbon fibre tow that is stretch broken to form fine carbon slivers and then spun into a yarn.

The resultant free-standing preform has a thickness of approximately 43 mm and is then carbonized in that form. The percentage fibre by volume of the preform is approximately 30%.

The preform produced by either of the aforedescribed methods of needling or stitching can be carbonized, during which operation the fibres shrink and further lock the structure together. This brake preform can be handled without the need for jigging to compress the structure to a given fibre volume, the required fibre volume having already been achieved by the compression exerted by the press during needling, or guide plates of the stitching machine, and also the contraction effect of subsequent carbonization. By eliminating the use of jigs the preform may be treated in a free-standing state by the infiltration of carbon in a CVD operation, enabling more efficient utilization of the furnace space to be achieved fin the production of carbon brake discs.

Due to the presence of thick fibre bundles extending axially through the disc, better thermal conductivity in the axial direction and higher interlaminar shear strength may be achieved.

The subject invention is of importance not only in its aspect of eliminating the conventional need to retain a body of carbon fibre or carbon fibre precursor material in a jig for subsequent processing, e.g. in a CVD furnace in which space is at a premium. It is of important significance also in that for a body comprising a stack of layers one or more layers of the stack can readily be assembled from a plurality of portions of sheet material rather than the conventionally used single pieces; in constructing an annular shaped layer for a brake disc the layer can be formed from a plurality of segments and there is a much smaller wastage of original sheet material than arise when using pieces pre-cut to an annular shape.

We claim:

1. A method of making a carbon fibre preform comprising forming a compressible body consisting essentially of a plurality of layers of carbon fibre or carbon fibre precursor material, compressing the body to a predetermined thickness while operating on the compressed body by needle means which penetrates substantially the whole thickness of the body, removing the compressed preform from action by the above-mentioned compressing step in a free-standing and compressed state of the predetermined thickness.

2. A method according to claim 1 in which the body comprises at least 10 layers of carbon fibre or precursor fibre material.

3. A method of making a carbon fibre preform comprising forming a compressible body of a three-dimensional array of a plurality of layers consisting essentially of carbon fibre or carbon fibre precursor material, compressing the body to a predetermined thickness while operating on the compressed body by needle means which penetrates substantially the whole thickness of the body, removing the compressed preform from action by the above-mentioned compressing step in a free-standing and compressed state of the predetermined thickness.

4. A method according to claim 3 in which said array comprises orientated fibre material.

5. A method according to claim 1 in which the needle means comprises barbed needles which are caused to penetrate substantially the whole thickness of the compressed body in each of a plurality of needle-punching operations so as to enable the compressed preform subsequently to be removed from the press in a free-standing and compressed state.

6. A method according to claim 5 in which a series of needle-punching operations are carried out without transverse movement of the body relative to the needles so that the needles penetrate the same areas of the fabric in each punching operation of the series thereby to produce an array of thick fibre bundles which extend through substantially the whole thickness of the preform.

7. A method according to claim 6 in which the body is subject to two series of punching operations and is moved transversely relative to the needles between said two series of punching operations thereby to produce two arrays of thick fibre bundles which each extend through substantially the whole thickness of the preform.

8. A method according to claim 7 in which the press is released to allow transverse movement of the stack relative to the press and the needles.

9. A method according to claim 7 in which use is made of a press member having two series of needle apertures whereby relative transverse movement between the body and needles may be achieved by performing one series of punching operations with the needles extending through one series of needle apertures and then moving the needles relative to the press member to perform a second series of punching operations during which the needles extend through a second series of needle apertures.

10. A method according to claim 5 in which the body is held in compression between a base plate and a perforated stripper plate through which the barbed needles pass to penetrate the body in the punching operations.

11. A method according to claim 5 in which after needle-punching the body is reversed and needle-punched from the reverse side.

12. A method according to claim 11 in which the body is reversed a plurality of times for needle-punching from each side.

13. A method according to claim 5 in which the body is needle-punched from two sides without being inverted between needle-punching operations.

14. A method according to claim 13 in which the body is needle-punched simultaneously from opposite sides.

15. A method according to claim 11 in which in each needle-punching operation the needles move in the same direction relative to the body.

16. A method according to claim 1 in which the needle means performs a stitching operation in which at least one stitched element penetrates substantially the whole thickness of the compressed body so as to enable the compressed preform subsequently to be removed from action by the compressing means in a free-standing and compressed state.

17. A method according to claim 16 in which said at least one stitched element comprises carbon or carbonizable material.

18. A method according to claim 16 in which said at least one stitched element comprises silica or silicon carbide.

19. A method according to claim 16 in which the element which undergoes the stitching operation is resistant to degradation by temperatures greater than 700° C.

20. A method according to claim 1 in which the carbon fibre or carbon fibre precursor material is non-woven staple fibre.

21. A method according to claim 1 in which the carbon fibre or carbon fibre precursor material comprises continuous filaments.

22. A method according to claim 1 in which the carbon fibre or carbon fibre precursor material is oxidized polyacrylonitrile fibre.

23. A method according to claim i in which the compressible body is annular.

24. A carbon-carbon composite article comprising a preform made by a method according to claim 1.

25. An article in accordance with claim 24 in which the article constitutes a carbon brake disc.

26. A method of claim 1 wherein the fibres in any of said layers are selected from the group consisting of woven fabric, batts and non-woven fabric.

27. A preform for a carbon-carbon composite article comprising a body consisting essentially of precompressed carbon fibre or carbon-fibre-precursor material maintained in said precompressed state by fibre elements which are substantially aligned with one another and parallel with the thickness direction of the preform, said fibre elements extending through substantially the whole thickness of the preform thereby to maintain substantially the whole thickness of the preform in said precompressed state.

28. A preform according to claim 27 wherein the body comprises discrete layers of carbon fibre or carbon fibre precursor material.

29. A preform according to claim 27 wherein the fibre elements comprise bundles of fibre elements produced by needling.

30. A preform according to claim 27 wherein the fibre elements comprise stitched fibre elements.

31. A preform according to claim 30 wherein said stitched elements are resistant to degradation by temperatures greater than 700° C.

32. A preform according to claim 31 wherein said stitched elements are resistant to degradation by temperatures greater than 1,000° C.

33. A carbon-carbon brake disc comprising a densified preform according to claim 27.

34. A method of making a preform consisting essentially of carbon fibre comprising forming a compressible body containing at least 10 oriented layers of oxidised polyacrylonitrile fibre, compressing the body to a predetermined thickness while needling the compressed body using barbed needles, in a series of needle-punching operations which are carried out without transverse movement of the body relative to the needles so that the needles penetrate the same areas of the fabric in each needle-punching operation of the series and are caused to penetrate substantially the whole thickness of the body thereby to produce an array of fibre bundles, so as to enable the compressed preform subsequently to be removed from action by the above-mentioned compressing step in a free-standing and compressed state of the predetermined thickness.

35. A method of making a carbon-carbon brake disc comprising the steps of:

forming a preform from a compressible body containing at least 10 orientated layers of oxidised polyacrylonitrile fibre, compressing the body to a predetermined thickness while needling the compressed body using barbed needles, in a series of needle-punching operations which are carried out without transverse movement of the body relative to the needles so that the needles penetrate the same areas of the fabric in each needle-punching operation of the series and are caused to penetrate substantially the whole thickness of the body thereby to produce an array of fibre bundles, removing the compressed preform from action by the above-mentioned compressing step in a free-standing and compressed state of the predetermined thickness carbonising the said oxidised polyacrylonitrile preform to produce a carbon fibre preform and densifying said preform consisting essentially of carbon fibre.

36. A preform for a carbon-carbon composite article comprising at least 10 layers consisting essentially of precompressed carbon fibre or carbon-fibre-precursor material maintained in said precompressed state by bundles of fibre elements produced by needling, said fibre elements being substantially aligned with one another and parallel with the thickness direction of the preform, said fibre elements extending through substantially the whole thickness of the preform thereby to maintain substantially the whole thickness of the preform in said precompressed state.

37. A preform for a carbon-carbon composite article comprising a body consisting essentially of precompressed carbon fibre or carbon-fibre-precursor material maintained in said precompressed state by stitched fibre elements resistant to degradation by temperatures greater than 700° C. which are substantially aligned with one another and parallel with the thickness direction of the preform, said fibre elements extending through substantially the whole thickness of the preform thereby to maintain substantially the whole thickness of the preform in said precompressed state.

* * * * *